United States Patent Office 3,522,885
Patented Aug. 4, 1970

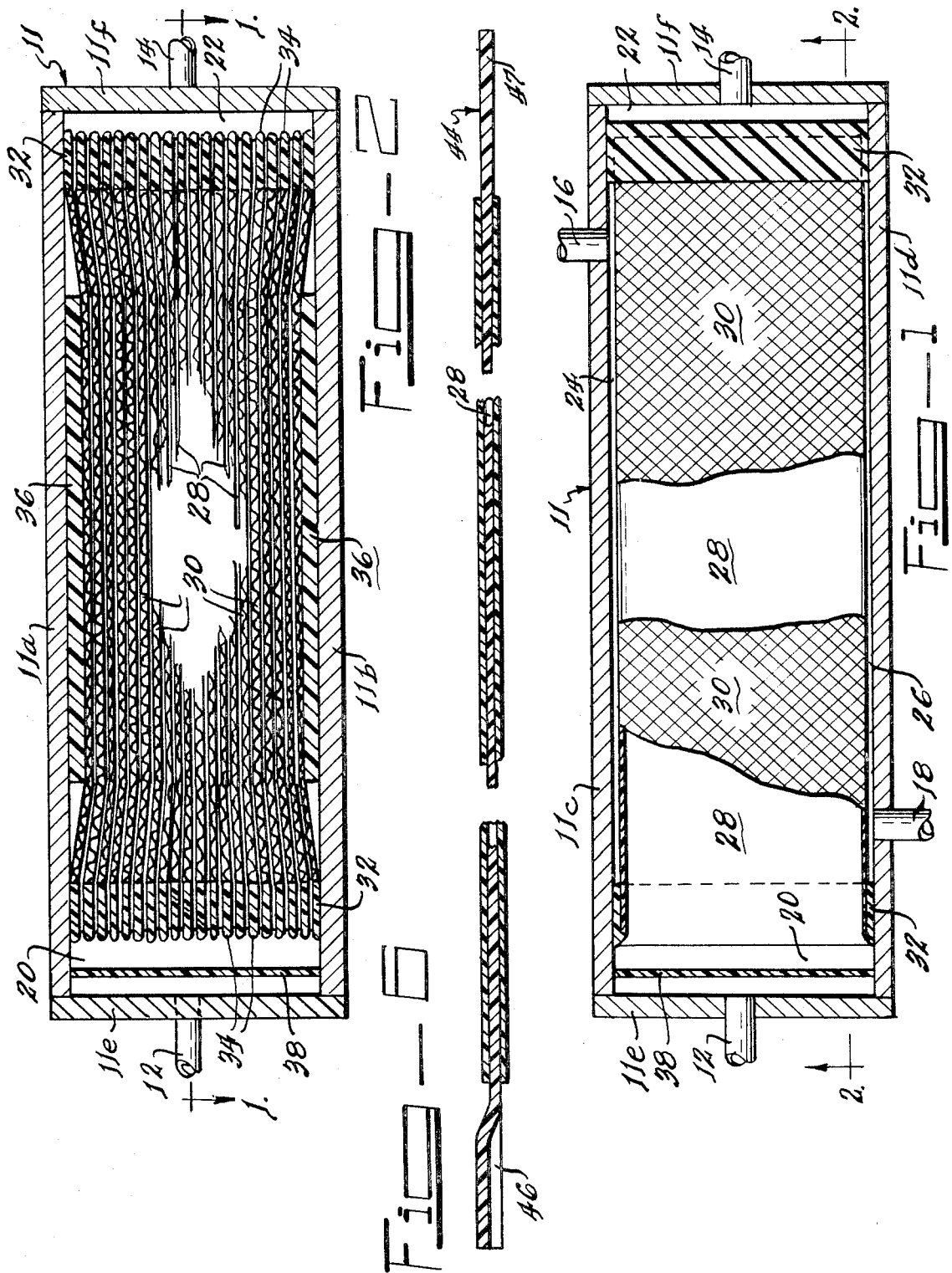

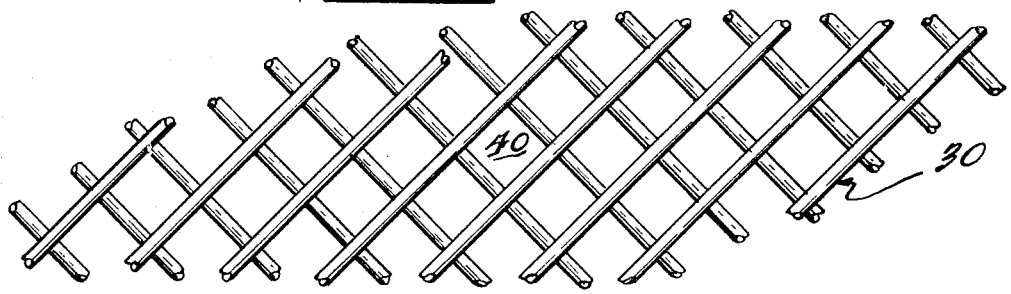
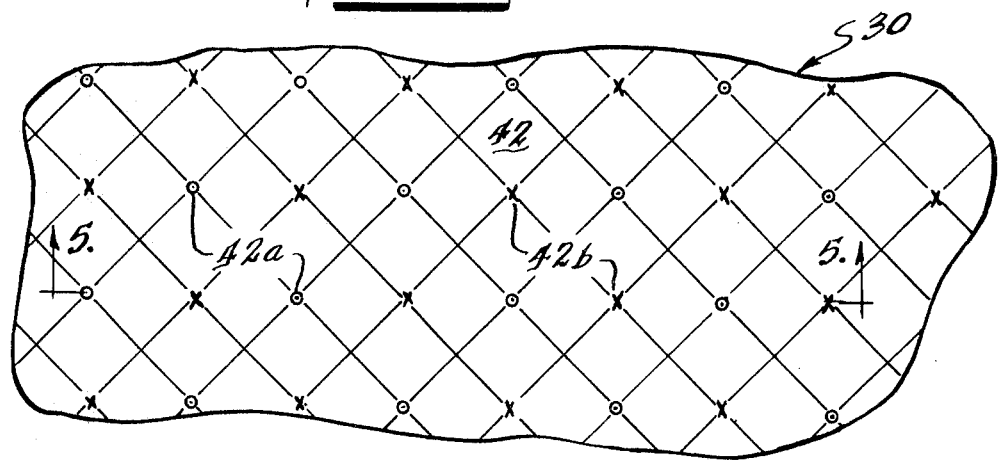
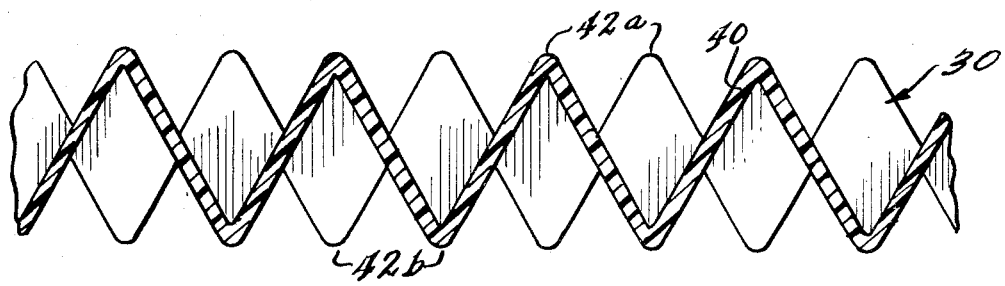

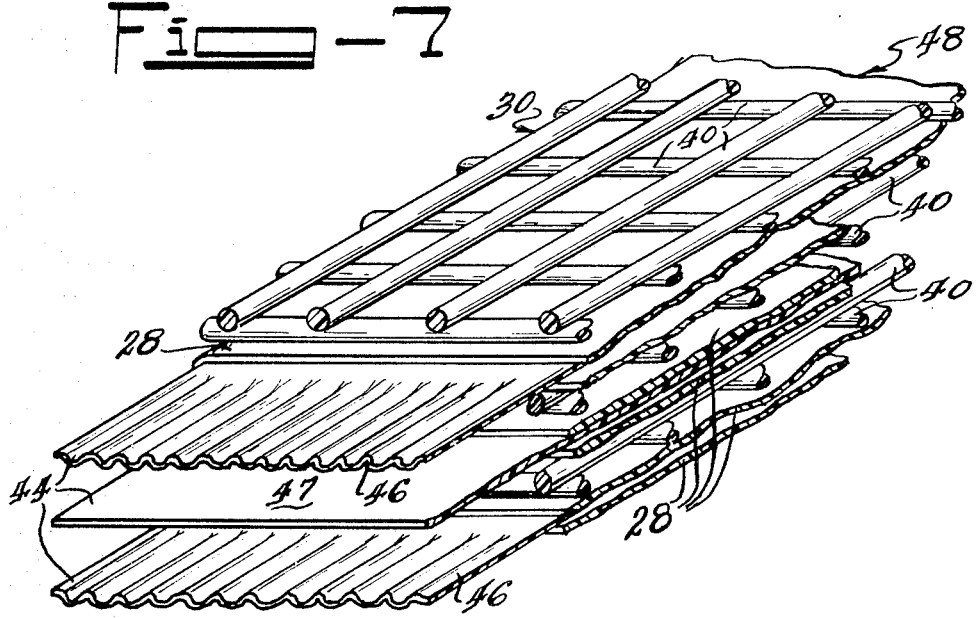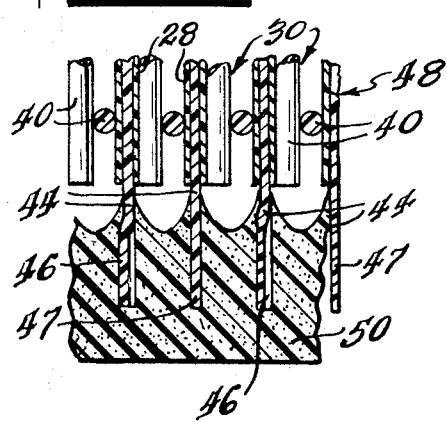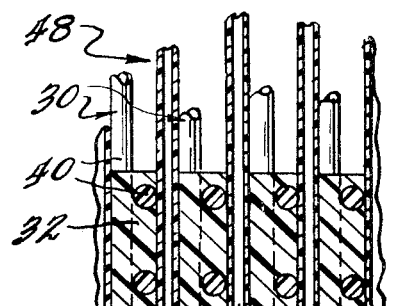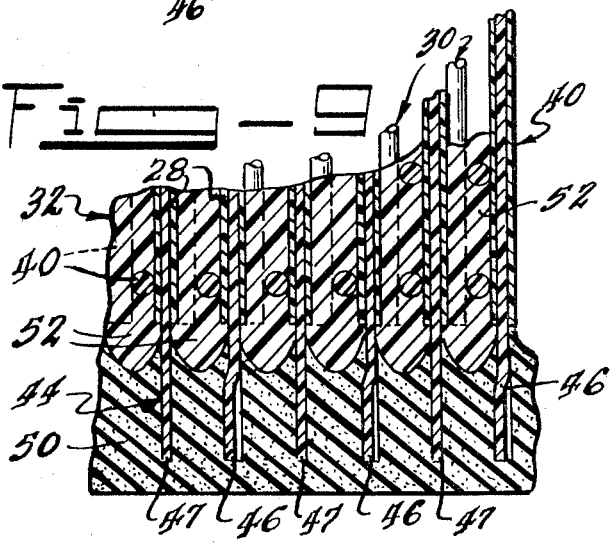

3,522,885
PARALLEL FLOW HEMODIALYZER
Ardis R. Lavender, Chicago, and Finley W. Markley, Naperville, Ill., assignors to the United States of America as represented by the United States Atomic Energy Commission
Filed Apr. 18, 1968, Ser. No. 722,445
Int. Cl. B01d *31/00, 13/00*
U.S. Cl. 210—321
14 Claims

ABSTRACT OF THE DISCLOSURE

A hemodialyzer with semipermeable membrane tubes arranged in parallel. The tubes lead to blood manifolds which are sealed from a dialysate chamber by a layer of epoxy resin surrounding the tube ends. The tube ends remain open during potting with the epoxy by having inserts in the tubes which are removed after the resin has set. The use of shims or inserts in the tubes to reduce the area in the tubes available for blood flow while the tube surface area remains the same increases dialysis efficiency.

CONTRACTUAL ORIGIN OF THE INVENTION

The invention described herein was made in the course of, or under, a contract with the United States Atomic Energy Commission.

BACKGROUND OF THE INVENTION

This invention relates to an apparatus and method for extra-corporeal hemodialysis and more particularly to hemodialysis with a small disposable unit usable in the home.

Hemodialysis is a proven and life saving therapy for people with chronic renal failure. At the present time, hemodialysis is costly, time-consuming and complex. Hemodialysis for each patient usually costs from $10,000 to $25,000 per year and requires skilled medical and technical personnel and also occupies valuable hospital bed space. It has been estimated that an annual increment of 50,000 people each year would benefit from hemodialysis therapy if it were economically and technically feasible, but at the present time, only about 900 persons are receiving treatment in the United States.

A common type of machine used for hemodialysis consists of a tightly wound cellophane tube submerged in a dialysate. Blood containing various amino impurities such as urea and creatinine as well as excessive amounts of sodium chloride and other salts passes through the cellophane tube. Since the concentration of the various impurities in the blood is greater than the concentration of the impurities in the dialysate, a concentration gradient is established across the cellophane. The cellophane acts as a semipermeable membrane through which the impurities may pass but not the blood. Since the cellophane tube is long and tightly wound, a blood pump is required to force blood through the tube. The blood in the tube is under greater pressure than the dialysate so a pressure gradient in addition to the aforementioned concentration gradient exists across the cellophane tube. The pressure gradient is a driving force which forces water from the blood into the dialysate. The blood is at greater pressure than the dialysate for two reasons: first, transfer of water from the blood is a renal function; and second, the greater pressure of the blood prevents contamination of the blood by dialysate if there is a leak in the tube.

The machine has several disadvantages with respect to home use. Because the pressure drop from one end to the other of the cellophane tube is large, a blood pump is necessary to force blood through the tube. Blood clots may result from use of the pump and care must be taken to prevent their formation. In addition, the blood inventory in the cellophane tube is substantial and a transfusion often is required when the machine is used. Only part of this blood can be recovered from the machine and since blood is expensive, this represents a significant cost in hemodialysis. It is clear that the machinery necessary for hemodialysis is not only complicated and expensive, but the required transfusions and blood pump prevent its use by anyone other than trained medical personnel. All these factors in addition to the limited amount of available hospital space result in people dying every year because hemodialysis is not available to them.

It is the principal object of this invention to provide a small disposable hemodialyzer which may be used at home by nonmedically trained personnel.

SUMMARY OF THE INVENTION

This invention generally comprises a dialyzer having semipermeable membrane tubes arranged in parallel connecting blood manifolds which are separated by a dialysate chamber. Dialysate in the dialysate chamber is sealed from the blood manifolds by a layer of epoxy resin surrounding the tube ends. The tubes are not plugged during potting with the epoxy resin by having inserts in them which are removed after the resin has set. Contact between the semipermeable membrane tubes and the blood therein is enhanced by reducing the area available for blood flow in the tubes while tube surface area remains unchanged.

BRIEF DESCRIPTION OF THE DRAWINGS

FIG. 1 is a sectional view of the device of this invention taken along line 1—1 of FIG. 2.

FIG. 2 is a sectional view taken along line 2—2 of FIG. 1.

FIG. 3 is a plan view of a species of support member.

FIG. 4 is a representation of a species of support member.

FIG. 5 is a sectional view taken along line 5—5 of FIG. 4.

FIG. 6 is a sectional view of a cellulose tube and corrugated insert.

FIG. 7 is an enlarged partial view of an assembly of support members and cellulose tubes with inserts.

FIGS. 8, 9 and 10 are sectional views of the device during different stages of fabrication.

DESCRIPTION OF PREFERRED EMBODIMENT

With reference to FIGS. 1 and 2, the dialyzer has a housing 11 which consists of a top 11a, a bottom 11b, sides 11c and 11d and ends 11e and 11f. Connected to housing 11 is a blood inlet 12 at end 11e and a blood outlet 14 at end 11f, a dialysate inlet 16 at side 11c and a dialysate outlet 18 at side 11d, of the housing. Blood inlet 12 leads to a blood inlet manifold 20 and blood outlet 14 leads from a blood outlet manifold 22. The dialysate inlet 16 leads to a dialysate inlet manifold 24 and the dialysate outlet 18 leads from a dialysate outlet manifold 26. A plurality of parallel tubes 28 are separated by support members 30. A layer of epoxy 32 at either end of the tubes 28 bonds the tubes and support members 30 to each other and to housing 11. The epoxy 32 extending from support members 30 into the blood inlet manifold 20 and the blood outlet manifold 22 has curved surfaces 34. Blood manifolds 20 and 22 are formed between housing ends 11e and 11f and curved surfaces 34 of epoxy 32. Dialysate manifolds 24 and 26 are formed between housing sides 11c and 11d and support members 30. Blood manifolds 20 and 22 are sealed from the dialysate manifolds 24 and 26 by the epoxy layer 32. A shim 36, as shown in FIG. 2, is located between the outermost of the support members 30 and housing top 11a and bottom 11b, and a perforated plate baffle 38 is located in the blood inlet manifold 20 between the blood inlet 12 and the tubes 28.

The support members 30 may be of several types as shown in FIGS. 3, 4 and 5. FIG. 3 shows a nonwoven mesh support 40 while FIGS. 4 and 5 show a support 42 of alternately inverted hollow pyramids. As represented in FIG. 4, the circled dots denote the apexes 42a of pyramids pointing out of the paper while the X's represent the apexes 42b of pyramids pointing into the paper. These pyramids are alternately arranged so that a pyramid pointing out of the paper is surrounded on four sides by a pyramid pointing into the paper and vice versa. The alternate pyramidal structure of support 42 may be readily seen by reference to FIG. 5.

The hemodialyzer of this invention is made by providing tubes 28 with inserts 44 as shown in FIG. 6. The inserts 44 are slightly longer than tubes 28 and have a corrugated end 46 and a noncorrugated end 47. As shown in FIG. 7, an assembly 48 consists of alternate layers of support members 30 and tubes 28 which are oblong in cross section. The outermost layers are preferably support members 30. Tubes 28 are arranged in assembly 48 so that the corrugated ends 46 of inserts 44 are between noncorrugated ends 47 and vice versa. As shown in FIG. 8, inserts 44 of assembly 48 are dipped into a meniscus-forming wetting agent 50 which is allowed to harden and form a mold. The wetting agent 50 contacts only the inserts 44 and does not touch the tubes 28 and support members 30. As shown in FIG. 9, after wetting agent 50 has hardened an epoxy resin 52 is poured into the interstices of assembly 48 and allowed to harden. The resin 52 contacts the wetting agent 50, inserts 44, support members 30 and tubes 28. The wetting agent 50, as well as inserts 44, are removed from assembly 48 as shown in FIG. 10 to leave a layer of epoxy 32 which has curved surfaces 34 that extend into manifolds 20 and 22.

In operation, blood enters blood inlet 12 into blood inlet manifold 20. The baffle 38 in manifold 20 distributes blood evenly across the cross-sectional area of assembly 48. The baffle 38, a perforated plate, may have either a larger number of holes near its periphery than at its center or may have holes of larger diameter near its periphery than near its center. The holes in baffle 38 may be beveled to prevent blood clotting if it occurs. Blood flows into tubes 28 and thence into blood outlet manifold 22 and blood outlet 14. Because of the parallel configuration of tubes 28 and comparatively short length the pressure drop from the blood inlet manifold 20 to the blood outlet manifold 22 is very small and a blood pump is not necessary. In addition, the blood inventory of the dialyzer is between about 40 ml. and 120 ml. depending upon the number of tubes 28, their length and cross-sectional area. Since the blood inventory is small no transfusions need be administered concurrent with dialysis. The fact that neither transfusions nor blood pumps are required with this invention permits dialysis to be carried out at home rather than in the hospital.

Dialysate enters through dialysate inlet 16 into dialysate inlet manifold 24 and flows across tubes 28 to the dialysate outlet manifold 26 and the dialysate outlet 18. As stated before, the dialysate has a lower concentration of the various amino impurities and salts than does the blood in tubes 28 and the resulting concentration gradient across the tubes is the driving force for dialysis. It should be noted that dialysate flow is countercurrent to blood flow for improved efficiency, but it is not necessary for operability.

It was previously stated that a pressure gradient across tubes 28 drives water from the blood to the dialysate. Since a blood pump is not required with this invention, the blood inside tubes 28 will be at the same pressure as in the vascular system connected thereto. Human blood pressure is about 860 mm. Hg. absolute pressure and if the dialysate is at atmospheric pressure the driving force would be about 100 mm. Hg. The preferred driving force is about 200 mm. Hg; therefore, the dialysate pressure is maintained at about 100 mm. Hg below atmospheric pressure. With about a 200 mm. Hg pressure gradient across tubes 28 and blood manifolds 20 and 22 sealed from dialysate manifolds 24 and 26, the conditions for dialysis are satisfied upon initiation of blood and dialysate flow.

One problem encountered in dialysis is blood clotting. When blood impinges on sharp objects, clotting will occur and to that end curved surfaces 34 in manifolds 20 and 22 are important in the prevention of blood clotting. In addition housing 11 may be heparin coated to prevent clotting or an anticlotting agent may be administered concurrent with dialysis.

Dialysis occurs across tubes 28 but it is only the blood in contact with the tube wall which is dialyzed. Other conditions being equal, the greater the amount of blood in contact with the surface area of tubes 28, the more efficient the dialysis. Notwithstanding the amount of blood in contact with tubes 28, dialysis only occurs where the dialysate contacts the tubes, so that dialysis efficiency is also determined by the tube surface area in contact with the dialysate. Increasing the blood in contact with the tube walls and increasing the tube surface area in contact with the dialysate may be accomplished in several ways.

Reducing the cross-sectional area within tubes 28 available for flow therethrough by decreasing the transverse dimension of the blood flow path, increases the amount of blood in contact with tubes 28 for a given volume of blood flowing through the tubes. This thinner flow path can be accomplished in one of two ways. Shims 36 disposed between the outer support members 30 and housing top 11a and bottom 11b compress tubes 28 inside the housing 11 so that the transverse dimension of tubes 28 is reduced. Since the flow path is thinner more blood will be in contact with the walls of tubes 28 than before shims 36 were present. The total width of shims 36 is determined by multiplying the number of tubes 28 by the size of the tube opening. For example, if there are 40 tubes 28 and each has an opening 0.006 inch in width then the total width of shims 36 would be 0.24 inch. When shims 36 are thus calculated, the blood flow path in tubes 28 is theoretically reduced to zero. In practice, tubes 28 expand into support members 30 due to the pressure gradient across the tubes and a blood flow path therethrough remains. The pressure drop from blood inlet manifold 20 to the blood outlet manifold 22 increases when shims 36 are used, but even with the shims in place the pressure drop is in the order of 10 to 20 mm. Hg at a blood flow rate of 300 cc./min. at 100 mm. Hg. Since the human heart can pump for a pressure drop of about 100 mm. Hg, it is clear that the use of shims 36 will not require the use of a blood pump.

An alternative method of increasing the amount of blood in contact with tubes 28 is to leave part of inserts 44 inside tubes 28 during fabrication of the dialyzer. This forces blood flow between the insert 44 and the tube walls. Since the amount of blood flowing through tubes 28 not in contact with the tube wall is reduced by both of these methods, the dialysis efficiency will increase. The use of inserts 44 does not have any greater adverse effect on the pressure drop from manifold 20 to manifold 22 than the use of shims 36.

Another method of increasing dialysis efficiency is to increase the area of tubes 28 in contact with the dialysate. Increased surface area may be accomplished by increasing the number of tubes 28 in the device but it also may be accomplished by a judicious choice of support member 30. Since there is about a 200 mm. Hg pressure difference between the dialysate and the blood within tubes 28, the tubes expand and but for the support members 30 would come in contact with each other. Obviously, that area of tubes 28 in contact with each other is removed from dialysis so it is essential that contact of tubes 28 with each other is minimized. The support members 30 shown in FIGS. 3, 4 and 5 represent alternatives to the problem.

The nonwoven mesh 40 provides adequate support and prevents contact between tubes 28, but the thinnest mesh commercially available at present is between 60 and 20 mils thick. Since a small unit is desirable, a thinner support member would be advantageous. One other deficiency with mesh 40 is the large amount of surface area of tubes 28 in contact with the mesh. Clearly all the surface area of tubes 28 in contact with mesh 40 is removed from dialysis.

Support 42 consists of alternately inverted pyramids and has several advantages over mesh 40, but it is more difficult to work with as will later be explained. Support 42 may be made from plastic sheets about 2 mils in thickness such as cellulose acetate or polyethylene terephthalate. The only contact between the support 42 and tubes 28 is at the apex 42a or 42b of each pyramid. An improved dialysis efficiency results because less surface area of tubes 28 is removed from dialysis and the device will be smaller because supports 42 are relatively thin.

The dialyzer of this invention is fabricated by assembling alternate layers of tubes 28 and support members 30. The tubes 28 may be any semipermeable membrane such as cuprophane, cellulose acetate, collegen or regenerated cellulose. Regenerated cellulose commonly known as cellophane is preferred for tubes 28 because it is inexpensive and readily available. Tubes 28 are provided with inserts 44 which are of generally the same cross-sectional area as the tubes and determine the blood flow path through the tubes. If the inserts 44 are to be entirely removed, that portion within tubes 28 may be slightly narrower than tubes 28 to prevent ripping the tubes when the inserts are withdrawn. If part of the inserts 44 remain within tubes 28 to act as an alternate to shims 36, then the inserts are uniform in width. Inserts 44 have transverse perforations so they can be easily removed from the tubes 28 by pulling on both ends of the inserts.

Insert 44 may be made of several different kinds of materials, the principal requirement being that it does not bond to epoxy. Polypropylene is a preferred material but an alternative may be a linear polyethylene or a trifluorochloro ethylene polymer. The corrugated ends 46 of inserts 44 provide rigidity so that the inserts 44 remain parallel and wetting agent 50 may flow therebetween. The corrugations on inserts 44 need not be the entire width of the insert nor need they terminate at the very end. An alternative to corrugated ends 46 is an arrangement of raised dots (not shown) on inserts 44 which would also separate the inserts and keep them parallel.

An assembly 48 consisting of alternate layers of support members 30 and tubes 28 having inserts 44 therein is aligned within the tops 11a and 11b and sides 11c and 11d of housing 11 and the ends of inserts 44 are dipped into wetting agent 50. The preferred wetting agent 50 is silicone rubber, but other materials such as various waxes or a wax-filled polyester may be used. The principal requirement for wetting agent 50 is that it wets the inserts 44 and forms a meniscus therewith but does not adhere to epoxy resin. After the wetting agent 50 has hardened to form a mold, an assembly 48 is potted with an epoxy resin 52 by entirely filling the interstices between support members 30 and cellophane tubes 28 with the resin. After epoxy resin 52 hardens, a complete seal is formed between support members 30, cellophane tubes 28, and the tops 11a and 11b and sides 11c and 11d of housing 11. Thereafter, the wetting agent 50 and the inserts 44 are removed. Since neither one of them adheres to epoxy 52, the configuration as partially shown in FIG. 10 results. Housing ends 11e and 11f are thereafter added and sealed to complete housing 11.

The size of the oblong opening in tubes 28 is determined by the size of insert 44. Inserts 44 having a 6 mil thickness have been used. It should be noted here that the curved surfaces 34 which result from the use of wetting agent 50 before potting with resin 52 reduce blood clotting but the dialyzer is operable without the curved surfaces. Assembly 48 could be potted with resin 52 and inserts 44 removed to produce an operable dialyzer.

One difficulty with the above procedure occurs when support members 30 are very thin because the epoxy 52 rises along the support members due to capillary action. This is undesirable because wherever the epoxy 52 contacts tubes 28 no dialysis can occur. Capillary action can be prevented by coating the ends of support members 30 with any material which is not wetted by the epoxy 52. Silicone rubber of several waxes such as paraffin are representative of the class of materials which will prevent the capillary action described. When support members 30 have their ends coated with paraffin, they will not be bonded to tubes 28 by the epoxy 52. In this case, support members 30 are cut slightly shorter than tubes 28 so that the tubes are bonded to each other by epoxy 52 and the support members 30 are held within the assembly 48 by housing 11. Housing 11 may be made of a variety of materials including metals, but a rigid plastic such as methacrylate is preferred. While FIGS. 1 and 2 show a rectangular shape for housing 11, it may obviously be cylindrical, oval, or any other desired shape.

Dialysate flow may be substantially enhanced when nonwoven supports 40 are used by substantially filling the dialysate inlet manifold 24 and outlet manifold 26 so as to force essentially diagonal flow of the dialysate between inlet 16 and outlet 18. It has been found that with the nonwoven mesh supports 40, dialysate flow is substantially transverse to the longitudinal axis of the housing which does not result in the greatest dialysis efficiency.

The device of this invention has been extensively tested both in vitro and in dogs. The in vitro experiments were conducted with artificial blood solutions containing known quantities of impurities such as urea, creatinine, sodium chloride and other salts. In all experiments the blood flow rate and the dialysate flow rate were recorded in milliliters per minute. Blood samples were taken, analyzed and the idalysance of various impurities calculated. Dialysance in milliliter per minute is defined as $$\frac{A-V}{A-D} \times \text{blood flow rate}$$

where:

A=concentration of impurity in blood entering dialyzer;
V=concentration of impurity in blood leaving dialyser; and
D=concentration of impurity in dialysate entering dialyzer.

All experiments were conducted at room temperature and except for the experiments with dogs, the blood flows and dialysate flows were adjusted with constant flow pumps. The data obtained from these experiments are presented in the following table:

TABLE

| | | | Dialysance (ml./min.) | | |
|---|---|---|---|---|---|
| | BF | DF | Urea | Creatinine | Na | Cl |
| Experiment: | | | | | | |
| 1 | 300 | 300 | | 18.8 | | |
| 2 | 288 | 396 | | 23.7 | | |
| | 288 | 276 | | 30.1 | | |
| | 288 | 132 | | 38.1 | | |
| | 212 | 132 | | 35.4 | | |
| | 136 | 132 | | 39.7 | | |
| | 136 | 132 | | 14.5 | | |
| | 212 | 132 | | 13.7 | | |
| | 60 | 132 | | 10.4 | | |
| | 288 | 132 | | 32.3 | | |
| | 288 | 276 | | 21.8 | | |
| | 288 | 396 | | 26.1 | | |

TABLE—Continued

| | BF | DF | Dialysance (ml./min.) Urea | Creatinine | Na | Cl |
|---|---|---|---|---|---|---|
| Experiment: | | | | | | |
| 2 (Dog) | 1,200 | 396 | | 23.4 | | |
| | 1,200 | 276 | | 21.6 | | |
| | 1,200 | 132 | | 31.1 | | |
| | 1,200 | 396 | | 23.1 | | |
| 3 | 315 | 126 | | 14.6 | | |
| | 315 | 282 | | 22.1 | | |
| | 315 | 462 | | 21.7 | | |
| | 315 | 588 | | 19.8 | | |
| | 315 | 732 | | 23.5 | | |
| | 232 | 142 | | 13.6 | | |
| | 232 | 274 | | 13.6 | | |
| | 232 | 444 | | 20.3 | | |
| | 232 | 572 | | 24.8 | | |
| | 232 | 720 | | 37.1 | | |
| | 154 | 116 | | 13.4 | | |
| | 154 | 276 | | 21.5 | | |
| | 154 | 432 | | 23.6 | | |
| | 154 | 572 | | 23.6 | | |
| | 76 | 124 | | 10.3 | | |
| | 76 | 238 | | 11.9 | | |
| | 76 | 444 | | 12.4 | | |
| | 76 | 556 | | 13.9 | | |
| | 76 | 712 | | 15.6 | | |
| 3 (Dog) | 312 | 720 | | 25.1 | | |
| | 312 | 558 | | 17.6 | | |
| | 312 | 432 | | 15.5 | | |
| | 312 | 280 | | 11.8 | | |
| | 312 | 136 | | 13.3 | | |
| | 200 | 136 | | 11.9 | | |
| | 200 | 280 | | 8.4 | | |
| 4 | 143 | 160 | 44.7 | 32.9 | | |
| | | 222 | 40.4 | 32.6 | | |
| | | 342 | 39.2 | 31.9 | | |
| | | 392 | 42.4 | 37.0 | | 54.8 |
| | | 520 | 43.2 | 39.6 | | 52.4 |
| | 220 | 160 | 22.9 | 26.2 | | 37.9 |
| | | 222 | 33.6 | 31.1 | | 44.1 |
| | | 342 | 43.4 | 38.1 | | 51.2 |
| | | 392 | 52.1 | 44.4 | | 55.2 |
| | | 520 | 46.0 | 40.9 | | 62.0 |
| | 308 | 160 | 45.7 | 33.1 | | 46.0 |
| | | 222 | 54.4 | 34.1 | | 54.9 |
| | | 342 | 50.5 | 37.8 | | 56.0 |
| | | 392 | 59.2 | 39.2 | | 65.4 |
| | | 520 | 59.2 | 53.7 | | 66.0 |
| | 384 | 160 | 40.1 | 32.1 | | 39.8 |
| | | 222 | 45.2 | 36.4 | | 54.6 |
| | | 342 | 37.9 | 43.5 | | 64.3 |
| | | 392 | 58.3 | 43.3 | | 56.2 |
| | | 520 | 61.9 | 47.6 | | 73.5 |
| | 468 | 160 | 38.9 | 30.6 | | 42.7 |
| | | 222 | 94.1 | 37.1 | | 38.4 |
| | | 342 | 92.2 | 38.2 | | 63.5 |
| | | 392 | 65.4 | 44.9 | | 67.1 |
| | | 520 | 65.4 | 47.1 | | 62.9 |
| 5 | 414 | 300 | 73 | 39 | 61 | 62 |
| | 136 | 138 | 71 | 21 | 32 | 33 |
| | | 207 | 104 | 19 | 32 | 34 |
| | | 276 | 99 | 21 | 34 | 35 |
| | | 354 | 116 | 21 | 33 | 34 |
| | | 426 | 67 | 20 | 31 | 32 |
| | 270 | 138 | 54 | 27 | 40 | 42 |
| | | 224 | 97 | 23 | 39 | 42 |
| | | 276 | 132 | 26 | 40 | 48 |
| | | 342 | 79 | 26 | 33 | 38 |
| | | 426 | 111 | 25 | 37 | 42 |
| | 426 | 132 | 73 | 26 | 38 | 40 |
| | | 204 | 79 | 30 | 43 | 47 |
| | | 270 | 119 | 28 | 50 | 53 |
| | | 324 | 161 | 26 | 45 | 47 |
| | | 426 | 78 | 30 | 51 | 46 |
| | 594 | 138 | 23 | 23 | 31 | 33 |
| | | 198 | 64 | 25 | 36 | 39 |
| | | 270 | 103 | 26 | 47 | 51 |
| | | 318 | 85 | 22 | 51 | 56 |
| | | 384 | 81 | 17 | 45 | 51 |
| | 744 | 132 | 46 | 38 | 47 | 43 |
| | | 198 | 45 | 30 | 47 | 42 |
| | | 264 | 62 | 39 | 56 | 66 |
| | | 324 | 41 | 27 | 52 | 54 |
| | | 372 | 25 | 27 | 58 | 57 |
| | 868 | 132 | 54 | 56 | 53 | 57 |
| | | 192 | 68 | 57 | 71 | 68 |
| | | 258 | 58 | 46 | 62 | 64 |
| | | 318 | 68 | 47 | 71 | 68 |
| | | 398 | 64 | 45 | 63 | 91 |
| | 720 | 144 | | | 105 | 105 |
| | | 213 | | | 120 | 123 |
| | | 276 | | | 91 | 112 |
| | | 312 | | | 96 | 93 |
| | | 390 | | | 73 | 79 |
| | | 480 | | | 61 | 79 |
| | 1,440 | 480 | | | 24 | 244 |
| 6 | 136 | 138 | 68 | 56 | 88 | 90 |
| | 136 | 209 | 37 | 49 | 59 | 72 |
| | | 272 | 45 | 26 | 59 | 59 |
| | | 352 | 56 | 56 | 80 | 89 |
| | | 427 | 66 | 33 | 49 | 64 |
| | 272 | 138 | 90 | 61 | 92 | 106 |
| | | 228 | 89 | 80 | 96 | 101 |
| | | 276 | 66 | 47 | 65 | 70 |
| | | 344 | 71 | 53 | 74 | 81 |
| | | 428 | 39 | 43 | 54 | 61 |

| | BF | DF | Dialysance (ml./min.) Urea | Creatinine | Na | Cl |
|---|---|---|---|---|---|---|
| Experiment: | | | | | | |
| | 428 | 136 | | 61 | 71 | 73 |
| | | 206 | | 73 | 96 | 106 |
| | | 272 | 79 | 24 | 67 | 85 |
| | | 326 | 54 | 13 | 47 | 61 |
| | | 426 | 52 | 21 | 57 | 50 |
| | 592 | 140 | | 71 | 80 | 79 |
| | | 198 | | 68 | 66 | 69 |
| | | 272 | | 41 | 61 | 68 |
| | | 320 | | 36 | 46 | 51 |
| | | 384 | | 41 | 59 | 63 |
| | 746 | 134 | 94 | 62 | 97 | 98 |
| | | 200 | 106 | 62 | 112 | 114 |
| | | 266 | | 90 | 121 | 126 |
| | | 326 | | 77 | 83 | 92 |
| | | 374 | | 88 | 98 | 100 |
| | 808 | 134 | 88 | 81 | 110 | 109 |
| | | 194 | 121 | 82 | 124 | 128 |
| | | 260 | 133 | 70 | 162 | 153 |
| | | 320 | 146 | 59 | 192 | 148 |
| | | 398 | 132 | 66 | 158 | 142 |
| 7 | 840 | 72 | 35 | 36 | 35 | 39 |
| | | 150 | 44 | 32 | 47 | 51 |
| | | 222 | 46 | 34 | 48 | 54 |
| | | 306 | 42 | 36 | 52 | 58 |
| | | 372 | 41 | 41 | 49 | 58 |
| | | 450 | 28 | 38 | 52 | 59 |
| | | 540 | 36 | 42 | 65 | 58 |
| | 1,176 | 150 | 46 | 22 | 43 | 51 |
| | | 228 | 24 | 32 | 49 | 58 |
| | | 300 | 38 | 34 | 80 | 61 |
| | | 390 | 45 | 41 | 55 | 75 |
| | | 462 | 40 | 35 | 46 | 62 |
| | | 540 | 62 | 39 | 56 | 76 |
| | 1,488 | 150 | 51 | 22 | 47 | 55 |
| | | 222 | 45 | 29 | 51 | 58 |
| | | 309 | 53 | 37 | 57 | 71 |
| | | 384 | 63 | 42 | 55 | 61 |
| | | 450 | 73 | 56 | 55 | 63 |
| | 1,800 | 162 | 63 | 43 | 56 | 60 |
| | | 234 | 64 | 39 | 62 | 73 |
| | | 312 | 74 | 45 | 70 | 73 |
| | | 396 | 87 | 50 | 67 | 76 |
| | | 450 | 87 | 49 | 57 | 87 |
| | 2,232 | 162 | 64 | 54 | 68 | 74 |
| | 738 | 168 | | | 138 | 101 |
| | | 234 | | | 134 | 138 |
| | | 294 | | | 142 | 144 |
| | | 342 | | | 145 | 143 |
| | | 432 | | | 129 | 132 |
| | | 480 | | | 97 | 92 |
| | 1,536 | 480 | | | 31 | 260 |
| 8 | 288 | 60 | 35 | 25 | 35 | 37 |
| | 528 | | 36 | 26 | 37 | 39 |
| | 796 | | 36 | 27 | 38 | 40 |
| | 1,140 | | 38 | 27 | 38 | 39 |
| | 1,500 | | 37 | 26 | 38 | 38 |
| | 102 | 150 | 50 | 35 | 49 | 52 |
| | 270 | | 39 | 31 | 41 | 43 |
| | 396 | | 43 | 32 | 45 | 50 |
| | 558 | | 46 | 32 | 50 | 52 |
| | 684 | | 48 | 33 | 49 | 21 |
| | 102 | 222 | 33 | 25 | 34 | 37 |
| | 300 | | 42 | 26 | 41 | 46 |
| | 432 | | 40 | 29 | 45 | 45 |
| | 552 | | 43 | 27 | 45 | 49 |
| | 696 | | 47 | 28 | 43 | 47 |
| | 90 | 306 | 32 | 26 | 28 | 34 |
| | 288 | | 45 | 29 | 48 | 48 |
| | 432 | | 51 | 28 | 39 | 47 |
| | 540 | | 39 | 26 | 40 | 49 |
| | 696 | | 46 | 32 | 45 | 53 |
| | 90 | 372 | 24 | 24 | 31 | 36 |
| | 300 | | 42 | 24 | 26 | 39 |
| | 438 | | 51 | 27 | 39 | 39 |
| | 576 | | 33 | 30 | 45 | 43 |
| | 732 | | | | | |
| | 270 | 66 | 23 | 28 | 27 | 28 |
| | 546 | | 26 | 18 | 28 | 29 |
| | 840 | | 28 | 18 | 29 | 30 |
| | 1,140 | | 29 | 19 | 30 | 32 |
| | 1,488 | | 30 | 20 | 32 | 33 |
| | 132 | 150 | 30 | 23 | 29 | 31 |
| | 264 | | 32 | 22 | 32 | 35 |
| | 396 | | 33 | 19 | 36 | 38 |
| | 528 | | 34 | 20 | 36 | 40 |
| | 672 | | 34 | 20 | 38 | 42 |
| | 132 | 222 | 26 | 18 | 26 | 35 |
| | 288 | | 35 | 21 | 35 | 37 |
| | 432 | | 34 | 22 | 36 | 41 |
| | 509 | | 36 | 18 | 35 | 39 |
| | 684 | | 36 | 22 | 35 | 43 |
| | 102 | 300 | 17 | 19 | 24 | 31 |
| | 294 | | 31 | 18 | 31 | 41 |
| | 420 | | 31 | 22 | 25 | 40 |
| | 516 | | 44 | 20 | 29 | 40 |
| | 684 | | 40 | 19 | 22 | 42 |
| | 102 | 378 | 16 | 26 | 22 | 29 |
| | 270 | | 22 | 24 | 35 | 44 |
| | 408 | | 37 | 31 | 38 | 42 |
| | 522 | | 40 | 27 | 44 | 49 |
| | 666 | | 45 | 23 | 41 | 49 |

TABLE—Continued

| Experiment: | BF | DF | Dialysance (ml./min.) Urea | Creatinine | Na | Cl |
|---|---|---|---|---|---|---|
| | 252 | 66 | 24 | 16 | 25 | 27 |
| | 516 | ------ | 27 | 17 | 28 | 29 |
| | 780 | ------ | 28 | 18 | 28 | 30 |
| | 1,122 | ------ | 28 | 18 | 29 | 31 |
| | 1,452 | ------ | 28 | 17 | 29 | 31 |
| | 282 | 144 | 31 | 21 | 32 | 37 |
| | 540 | ------ | 27 | 21 | 33 | 36 |
| | 816 | ------ | 38 | 23 | 36 | 41 |
| | 1,140 | ------ | 36 | 25 | 35 | 43 |
| | 1,464 | ------ | 37 | 25 | 37 | 43 |
| | 258 | 216 | 33 | 26 | 33 | 35 |
| | 540 | ------ | 30 | 25 | ------ | 42 |
| | 816 | ------ | 38 | 25 | 39 | 39 |
| | 1,140 | ------ | 53 | 21 | 40 | 45 |
| | 1,488 | ------ | 35 | 19 | 57 | 46 |
| | 300 | 288 | 30 | 22 | 34 | 36 |
| | 516 | ------ | 39 | 18 | 35 | 47 |
| | 840 | ------ | 45 | 24 | 38 | 46 |
| | 1,098 | ------ | 46 | 23 | 27 | 38 |
| | 1,476 | ------ | 44 | 26 | 37 | 48 |
| | 276 | 372 | 23 | 16 | 37 | 41 |
| | 552 | ------ | 26 | 19 | 38 | 37 |
| | 876 | ------ | 19 | 19 | 38 | 58 |
| | 1,176 | ------ | 25 | 17 | 53 | 51 |
| | 1,458 | ------ | 40 | 20 | 44 | 49 |
| | 276 | 456 | 39 | 31 | 35 | 35 |
| | 540 | ------ | 33 | 22 | 49 | 48 |
| | 804 | ------ | 16 | 29 | 41 | 43 |
| | 1,152 | ------ | 22 | 22 | 50 | 48 |
| | 1,500 | ------ | 36 | 29 | 48 | 52 |
| 9 | 300 | 76 | 39 | 25 | 39 | 41 |
| | -------- | 148 | 43 | 30 | 43 | 48 |
| | -------- | 228 | 50 | 30 | 46 | 50 |
| | -------- | 320 | 61 | 33 | 49 | 55 |
| | -------- | 372 | 52 | 24 | 44 | 48 |
| | 636 | 72 | 22 | 22 | 35 | 37 |
| | -------- | 160 | 46 | 30 | 45 | 50 |
| | -------- | 240 | 39 | 34 | 48 | 55 |
| | -------- | 312 | 52 | 35 | 46 | 61 |
| | -------- | 372 | 57 | 31 | 53 | 63 |
| | -------- | 390 | 80 | 27 | 50 | 50 |
| | 660 | 80 | 39 | 22 | 36 | 40 |
| | -------- | 150 | 40 | 25 | 42 | 45 |
| | -------- | 240 | 32 | 20 | 46 | 49 |
| | -------- | 312 | 58 | 31 | 52 | 51 |
| | -------- | 390 | 52 | 32 | 50 | 49 |
| | 900 | 80 | 38 | 23 | 38 | 40 |
| | -------- | 140 | 50 | 25 | 40 | 45 |
| | -------- | 208 | 50 | 24 | 40 | 45 |
| | -------- | 320 | 50 | 36 | 53 | 61 |
| | -------- | 398 | 61 | 28 | 55 | ------ |
| | 1,380 | 75 | 40 | 29 | 39 | ------ |
| | -------- | 148 | 30 | 32 | 48 | ------ |
| | -------- | 234 | 59 | 35 | 53 | ------ |
| | -------- | 318 | 63 | 37 | 62 | ------ |
| | -------- | 373 | 69 | 30 | 60 | ------ |
| | 300 | 75 | 36 | 25 | 32 | ------ |
| | -------- | 162 | 43 | 26 | 39 | ------ |
| | -------- | 234 | 46 | 32 | 39 | ------ |
| | -------- | 312 | 52 | 29 | 40 | ------ |
| | -------- | 384 | 21 | 39 | 40 | ------ |
| | 660 | 68 | 38 | 27 | 36 | ------ |
| | -------- | 152 | 49 | 31 | 45 | ------ |
| | -------- | 322 | 66 | 53 | 64 | ------ |
| | -------- | 318 | 69 | 42 | 53 | ------ |
| | -------- | 390 | 72 | 36 | 59 | ------ |
| | 936 | 76 | 43 | 28 | 39 | ------ |
| | -------- | 144 | 44 | 34 | 47 | ------ |
| | -------- | 228 | 69 | 37 | 47 | ------ |
| | -------- | 318 | 53 | 38 | 53 | ------ |
| | -------- | 390 | 65 | 37 | 51 | ------ |
| | 1,296 | 72 | 36 | 22 | 35 | ------ |
| | -------- | 148 | 48 | 23 | 44 | ------ |
| | -------- | 232 | 56 | 27 | 44 | ------ |
| | -------- | 312 | 58 | 31 | 47 | ------ |
| | -------- | 390 | 71 | 31 | 50 | ------ |
| 9 (Dog) | 330 | 310 | 11 | 7 | ------ | |
| | 528 | ------ | 15 | 11 | ------ | |
| | 780 | ------ | 22 | 15 | ------ | |
| | 864 | ------ | 6 | 7 | ------ | |
| | 996 | ------ | 10 | 9 | ------ | |
| | 1,230 | ------ | 15 | 13 | ------ | |
| | 1,500 | ------ | 19 | 6 | ------ | |
| | 1,590 | ------ | 30 | 11 | ------ | |
| | 1,590 | ------ | 33 | 21 | ------ | |
| | 1,500 | ------ | 4 | 23 | ------ | |
| | 1,230 | ------ | 21 | 15 | ------ | |
| | 990 | ------ | 38 | 16 | ------ | |
| | 840 | ------ | 9 | 22 | ------ | |
| | 732 | ------ | 20 | 20 | ------ | |
| | 552 | ------ | 51 | 7 | ------ | |
| | 312 | ------ | 23 | 15 | ------ | |
| 9A | 300 | 150 | 43 | 31 | 43 | 45 |
| | 630 | ------ | 52 | 31 | 46 | 48 |
| | 930 | ------ | 50 | 36 | 49 | 52 |
| | 1,260 | ------ | 52 | 34 | 50 | 53 |
| | 1,600 | ------ | 55 | 35 | 51 | 55 |
| | 300 | 222 | | | | |
| | 620 | ------ | 51 | 26 | 46 | 96 |
| | 950 | ------ | 60 | 31 | 53 | 56 |
| | 1,260 | ------ | 60 | 36 | 56 | 55 |
| | 1,600 | ------ | 64 | 41 | 56 | 63 |

| Experiment: | BF | DF | Dialysance (ml./min.) Urea | Creatinine | Na | Cl |
|---|---|---|---|---|---|---|
| | 306 | 300 | 55 | 43 | 48 | 46 |
| | 630 | ------ | 62 | 31 | 53 | 56 |
| | 945 | ------ | 55 | 33 | 57 | 61 |
| | 1,260 | ------ | 61 | 29 | 57 | 68 |
| | 1,620 | ------ | 60 | 38 | 60 | 69 |
| | 294 | 372 | 70 | 34 | 77 | 82 |
| | 624 | ------ | 71 | 35 | 66 | 75 |
| | 944 | ------ | 78 | 45 | 70 | 78 |
| | 1,290 | ------ | 79 | 49 | 68 | 77 |
| | 1,600 | ------ | 81 | 26 | 70 | 76 |
| 9A (Dog) | 100 | 310 | 38 | 17 | ------ | ------ |
| | 512 | ------ | 28 | 27 | ------ | ------ |
| | 724 | ------ | 31 | 15 | ------ | ------ |
| | 1,020 | ------ | 36 | 19 | ------ | ------ |
| | 1,320 | ------ | | 13 | ------ | ------ |
| | 1,320 | ------ | 95 | 13 | ------ | ------ |
| | 1,020 | ------ | | 15 | ------ | ------ |
| | 726 | ------ | | 19 | ------ | ------ |
| | 504 | ------ | | 14 | ------ | ------ |
| | 104 | ------ | 39 | 14 | ------ | ------ |
| | 70 | ------ | | 9 | ------ | ------ |
| | 492 | ------ | 35 | 22 | ------ | ------ |
| | 680 | ------ | 48 | 18 | ------ | ------ |
| | 1,092 | ------ | 67 | 22 | ------ | ------ |
| | 1,392 | ------ | 68 | 22 | ------ | ------ |
| | 1,392 | ------ | 51 | 17 | ------ | ------ |
| | 1,024 | ------ | 61 | 23 | ------ | ------ |
| | 682 | ------ | 66 | 7 | ------ | ------ |
| 10 | 292 | 76 | 37 | 25 | 24 | 37 |
| | -------- | 140 | 42 | 27 | 41 | 42 |
| | -------- | 222 | 39 | 28 | 42 | 41 |
| | -------- | 312 | 79 | 32 | 42 | 48 |
| | -------- | 378 | 52 | 26 | 46 | 43 |
| | 630 | 69 | 34 | 22 | 32 | 35 |
| | -------- | 148 | 43 | 29 | 41 | 44 |
| | -------- | 234 | 44 | 28 | 42 | 48 |
| | -------- | 312 | 49 | 35 | 48 | 78? |
| | -------- | 378 | 77 | 36 | 52 | 54 |
| | 800 | 72 | 37 | 28 | 34 | 36 |
| | -------- | 156 | 48 | 38 | 44 | 46 |
| | -------- | 228 | 43 | 34 | 42 | 4? |
| | -------- | 308 | 57 | 42 | 48 | 62 |
| | -------- | 390 | 48 | 39 | 47 | 58 |
| | 1,272 | 78 | 39 | 18 | 34 | 41 |
| | -------- | 150 | 49 | 35 | 49 | 51 |
| | -------- | 228 | 62 | 37 | 52 | 58 |
| | -------- | 306 | 68 | 78? | 57 | 55 |
| | -------- | 390 | 75 | 92? | 50 | 75 |
| | 1,272 | 78 | 34 | 20 | 32 | 33 |
| | -------- | 150 | 52 | 32 | 44 | 49 |
| | -------- | 228 | 52 | 40 | 56 | 58 |
| | -------- | 312 | 72 | 32 | 59 | 57 |
| | -------- | 384 | 84 | 32 | 48 | 76 |
| | 800 | 156 | 51 | 27 | 45 | 46 |
| | -------- | 232 | 77 | 32 | 46 | 52 |
| | -------- | 312 | 71 | 79? | 48 | 57 |
| | -------- | 384 | 63 | 32 | 54 | 70 |
| | 636 | 72 | 36 | 25 | 35 | 35 |
| | -------- | 150 | 51 | 31 | 42 | 46 |
| | -------- | 234 | 43 | 35 | 50 | 51 |
| | -------- | 312 | 55 | 43 | 50 | 46 |
| | -------- | 384 | 76 | 48 | 38 | 58 |
| | 280 | 72 | 29 | 21 | 27 | 29 |
| | -------- | 142 | 40 | 20 | 31 | 36 |
| | -------- | 222 | 46 | 35 | 33 | 37 |
| | -------- | 318 | 51 | 30 | 36 | 41 |
| | -------- | 384 | 58 | 29 | 41 | 40 |
| 10 (Dog) | 300 | 310 | ------ | 19 | | |
| | 492 | 310 | ------ | 15 | (Data is questionable) | |
| | 700 | 310 | ------ | 9 | | |
| | 800 | 310 | ------ | 8 | | |
| | 900 | 310 | ------ | 5 | | |
| | 1,140 | 310 | ------ | 6 | | |
| | 1,420 | 310 | ------ | 5 | | |
| | 1,440 | 310 | ------ | 9 | | |
| 10A | 860 | 300 | 46 | 22 | 45 | 54 |
| | 1,160 | ------ | 48 | 29 | 49 | 54 |
| | 1,520 | ------ | 48 | 27 | 50 | 55 |
| | 320 | ------ | 42 | 25 | 46 | 48 |
| | 312 | 148 | 34 | 24 | 29 | 29 |
| | 624 | ------ | 39 | 26 | 38 | 38 |
| | 960 | ------ | 50 | 30 | 42 | 42 |
| | 1,245 | ------ | 74 | 28 | 43 | 45 |
| | 1,580 | ------ | 72 | 28 | 46 | 68 |
| | 306 | 222 | 53 | 26 | 36 | 42 |
| | 654 | ------ | 54 | 23 | 40 | 41 |
| | 975 | ------ | 55 | 28 | 43 | 48 |
| | 1,290 | ------ | 61 | 30 | 47 | 48 |
| | 1,620 | ------ | 69 | 36 | 58 | 54 |
| | 306 | 296 | 60 | 26 | 31 | 38 |
| | 645 | ------ | 65 | 28 | 43 | 47 |
| | 960 | ------ | 63 | 35 | 42 | 49 |
| | 1,320 | ------ | 69 | 33 | 49 | 52 |
| | 1,640 | ------ | 56 | 46 | 52 | 58 |
| | 348 | 372 | 87 | 27 | 60 | 58 |
| | 666 | ------ | 84 | 28 | 52 | 60 |
| | 1,026 | ------ | 81 | 36 | 55 | 67 |
| | 1,320 | ------ | 77 | 40 | 49 | 71 |
| | 1,640 | ------ | 79 | 35 | 56 | 61 |

TABLE—Continued

| Experiment: | BF | DF | Dialysance (ml./min.) | | | |
|---|---|---|---|---|---|---|
| | | | Urea | Creatinine | Na | Cl |
| 11 | 96 | 136 | 42 | 19 | 34 | 35 |
| | 500 | | 63 | 40 | 61 | 66 |
| | 720 | | 61 | 42 | 62 | 64 |
| | 1,020 | | 65 | 44 | 65 | 70 |
| | 1,356 | | 74 | 44 | 68 | 71 |
| | 88 | 216 | 43 | 32 | 40 | 38 |
| | 472 | | 60 | 48 | 67 | 69 |
| | 684 | | 70 | 49 | 70 | 74 |
| | 1,032 | | 81 | 51 | 74 | 81 |
| | 1,356 | | 74 | 55 | 75 | 80 |
| | 80 | 300 | 45 | 18 | 37 | 37 |
| | 480 | | 57 | 44 | 65 | 68 |
| | 672 | | 69 | 37 | 68 | 71 |
| | 984 | | 67 | 38 | 70 | 78 |
| | 1,320 | | 74 | 33 | 68 | 76 |
| | 84 | 300 | 25 | 19 | 26 | 29 |
| | 456 | | 66 | 36 | 55 | 62 |
| | 660 | | 68 | 44 | 57 | 68 |
| | 948 | | 58 | 42 | 66 | 73 |
| | 1,320 | | 75 | 40 | 72 | 75 |
| | 84 | 316 | 37 | 15 | 24 | 23 |
| | 456 | | 55 | 32 | 57 | 57 |
| | 648 | | 64 | 40 | 55 | 64 |
| | 940 | | 61 | 40 | 61 | 69 |
| | 1,296 | | 75 | 41 | 69 | 75 |
| | 100 | 132 | 27 | 13 | 29 | 29 |
| | 448 | | 53 | 36 | 50 | 50 |
| | 640 | | 55 | 37 | 53 | 55 |
| | 920 | | 58 | 37 | 5∞ | 59 |
| | 1,296 | | 60 | 39 | 59 | 62 |
| 12 | 1,308 | 292 | 77 | 45 | 68 | 76 |
| | 1,008 | | 72 | 49 | 68 | 70 |
| | 708 | | 64 | 38 | 64 | 68 |
| | 520 | | 62 | 38 | 58 | 62 |
| | 100 | | 51 | 32 | 33 | 36 |
| | 608 | 456 | 82 | 46 | 67 | 72 |
| | | 378 | 81 | 47 | 67 | 73 |
| | | 296 | 69 | 49 | 61 | 68 |
| | | 222 | 68 | 44 | 61 | 66 |
| | | 138 | 54 | 36 | 50 | 54 |
| | | 462 | 91 | 51 | 65 | 73 |
| | | 384 | 86 | 44 | 61 | 67 |
| | | 282 | 70 | 40 | 52 | 59 |
| | | 222 | 67 | 38 | 50 | 56 |
| | | 138 | 51 | 27 | 44 | 47 |
| | | 476 | 83 | 37 | 59 | 63 |
| | | 378 | 58 | 52 | 54 | 66 |
| | | 294 | 69 | 40 | 55 | 65 |
| | | 222 | 66 | 37 | 53 | 57 |
| | | 144 | 45 | 25 | 46 | 50 |
| 13 | 480 | 292 | | | 63.2 | |
| | 104 | 292 | | | 40.9 | |
| | 468 | 292 | | | 64.0 | |
| | 660 | 292 | | | 67.0 | |
| | 924 | 292 | | | 60.3 | |
| | 1,302 | 292 | | | 66.5 | |
| | 948 | 292 | | | 67.0 | |
| | 624 | 292 | | | 58.6 | |

BF = Blood flow in ml./min.
DF = Dialysate flow in ml./min.

Experiments 1–3 were conducted with a device which had 25 cellophane tubes with a wall thickness of 0.001 inch and an oblong opening 0.006 inch by 1.75 inches. The blood manifolds 20 and 22 were 2 inches by 2 inches by 0.0625 inch. The over-all dimensions of housing 11 were 7.25 inches by 2.5 inches by 2.5 inches, and the effective dialysis surface area was about 3400 cm.$^2$ or about one fourth the surface area of a commercial machine. Except for low blood or dialysate flow rates, creatinine dialysance ranged from 15 to 35 ml./min. or about one fourth the creatinine dialysance value of 80 ml./min. for the commercial machine referred to above.

Experiments 4–13 were conducted on devices with more than 25 tubes. The devices used in experiments 5, 6 and 7 leaked due to faulty potting of tubes 28 but this defect was corrected in later devices. Experiments 9A and 10A were performed with devices which had shims 36. The blood inventory in the dialyzer without shims 36 was about 120 ml. but with two shims the inventory was about 40 ml. As previously stated the increase in pressure drop from manifold 20 to manifold 22 was only about 10 to 20 mm. Hg. A comparison of the data for experiments 9 and 9A and 10 and 10A shows that in general urea and creatinine dialysance improves with the addition of shims 36. The experiments 9 dog and 9A dog also reflect the improved dialysance obtainable with the addition of shims 36.

The embodiments of the invention in which an exclusive property or privilege is claimed are defined as follows:

1. A hemodialyzer comprising a housing having at one end a blood inlet manifold and at the other end a blood outlet manifold, a dialysate chamber between said manifolds and sealed therefrom, a plurality of semipermeable membranes in the form of parallel oblong tubes extending through the dialysate chamber and sealingly connecting the blood inlet manifold and the blood outlet manifold, supports disposed between the parallel tubes, said oblong tubes being sealed to the housing and connected to the blood manifolds by a layer of epoxy resin surrounding the ends of said tubes and supports and extending into the said manifolds between each oblong tube and forming a seal between the blood manifolds and the dialysate chamber, a blood inlet leading to the blood inlet manifold, a blood outlet leading from the blood outlet manifold, and a dialysate inlet and outlet connected to the dialysate chamber.

2. The dialyzer of claim 1 wherein the epoxy resin extending into the said manifolds between each curved tube has curved surfaces.

3. A method of making the dialyzer of claim 1 comprising: assembling alternate layers of cellophane tubes and supports, each cellophane tube having an insert extending beyond both ends of the tubes; potting each end of the assembled cellophane tubes and supports with an epoxy resin; withdrawing the inserts from each cellophane tube; and mounting the potted tubes and supports into a housing of longer length than the tubes, thereby forming a manifold at either end and a chamber therebetween, said housing having a blood inlet and outlet in communication with the tubes and a dialysate inlet and outlet in communication with the chamber.

4. A method of making the dialyzer of claim 1 comprising: assembling alternate layers of cellophane tubes and supports, each cellophane tube having an insert extending beyond both ends of the tube; immersing the ends of the inserts into a meniscus-forming wetting agent; forming a mold of said wetting agent around the inserts, said mold having curved surfaces between each insert; potting each end of the cellophane tubes and inserts with an epoxy resin; removing the mold and the inserts from the potted tubes and supports; and mounting the potted tubes and supports into a housing of longer length than the tubes, thereby forming a manifold at either end and a chamber therebetween, said housing having a blood inlet and outlet in communication with the manifolds and a dialysate inlet and outlet in communication with the chamber.

5. The dialyzer of claim 1 and further comprising means for reducing the cross-sectional area within the tubes available for flow therethrough.

6. The dialyzer of claim 5 wherein the means for reducing the cross-sectional area within the tubes available for flow therethrough comprise a shim located between the housing and the potted tubes and supports.

7. The dialyzer of claim 5 wherein the means for reducing the cross-sectional area within the tubes available for flow therethrough comprise inserts within the tubes, said inserts being of substantially the same cross-sectional area as the tubes.

8. The dialyzer of claim 5 wherein the supports are sheets of nonwoven plastic mesh less than about 60 mils in thickness.

9. The dialyzer of claim 5 and further comprising a baffle in the blood inlet manifold between the blood inlet and the tubes.

10. The dialyzer of claim 5 wherein the supports are sheets having impressed therein alternately inverted hollow pyramids or cones.

11. The dialyzer of claim 10 wherein the supports are formed from plastic sheets less than about 10 mils in thickness.

12. A method of making the dialyzer of claim 8 comprising: providing a plurality of cellophane tubes with inserts longer than the tube so that the insert extends from both ends of the tube, said inserts having one end corrugated and one end noncorrugated; assembling alternate layers of cellophane tubes and supports, the tubes being arranged so that the corrugated end of each insert is between the noncorrugated end of the inserts on either side thereof; immersing the ends of the inserts into a liquid silicone rubber which wets the inserts and forms a meniscus therewith; polymerizing the silicone rubber to form a solid mold around the inserts; potting each end of the tubes and inserts with an epoxy resin; withdrawing the inserts from the tubes; and mounting the potted tubes and supports into a housing of longer length than the tubes, thereby forming a manifold at either end and a chamber therebetween, said housing having a blood inlet and outlet in communication with the tubes and a dialysate inlet and outlet in communication with the chamber.

13. The method of claim 12 wherein the inserts are polypropylene and the supports are a plastic sheet less than about 10 mils in thickness, said supports being slightly shorter than the cellophane tubes and further comprising the step of: applying a thin layer of wax to the ends of the supports prior to assembling the alternate layers of cellophane tubes and supports.

14. A hemodialyzer comprising: a rectangular plastic housing; a plurality of parallel cellophane tubes having an oblong cross-section and a wall thickness of about 1 mil located within the housing, said tubes being shorter than said housing; a plurality of supports about 2 mils in thickness located between the tubes and between the tubes and the housing, said supports having impressed therein alternately inverted pyramids, said supports being shorter than the tubes and having a wax coating on each end thereof; a layer of epoxy resin at both ends of the tubes sealing the tubes to each other and to the housing, said epoxy resin layers forming therebetween and with the housing a dialysate chamber; a blood inlet and a blood outlet in the housing, said blood inlet and outlet in communication with the tubes; a perforated plate in the housing between the tubes and the blood inlet; and a dialysate inlet and outlet in the housing in communication with the dialysate chamber, said dialysate inlet being proximate the blood outlet and said dialysate outlet being proximate the blood inlet.

References Cited

UNITED STATES PATENTS

| | | | |
|---|---|---|---|
| 2,972,349 | 2/1961 | De Wall | 210—321 X |
| 3,228,877 | 1/1966 | Mahon | 210—22 |
| 3,266,629 | 8/1966 | Megibow | 210—321 |
| 3,401,798 | 9/1968 | Hyrop | 210—321 |

OTHER REFERENCES

Bluemle et al.: "Permeability and Hydrodynamic Studies on the MacNeill-Collins Dialyzer Using Conventional and Modified Membrane Supports," from Transactions of the American Society for Artificial Internal Organs, vol. VI, 1960, pp. 38–43 relied on.

REUBEN FRIEDMAN, Primary Examiner

F. A. SPEAR, JR., Assistant Examiner

U.S. Cl. X.R.

264—225